United States Patent [19]

Radlein et al.

[11] Patent Number: 5,676,727
[45] Date of Patent: Oct. 14, 1997

[54] METHOD OF PRODUCING SLOW-RELEASE NITROGENOUS ORGANIC FERTILIZER FROM BIOMASS

[76] Inventors: Desmond St. A. G. Radlein, 306-168 Wissler Rd., Waterloo, Ontario, Canada, N2K 2T4; Jan K. Piskorz, 315 Concordia Cres., Waterloo, Ontario, Canada, N2K 2N2; Piotr A. Majerski, 443 Hazel Street, Waterloo, Ontario, Canada, N2L 3P7

[21] Appl. No.: 568,549

[22] Filed: Dec. 7, 1995

[30] Foreign Application Priority Data

Dec. 9, 1994 [GB] United Kingdom .............. 9424914

[51] Int. Cl.$^6$ ............................................. C05F 3/00
[52] U.S. Cl. ....................... 71/12; 71/11; 71/14; 71/23; 71/25; 71/27
[58] Field of Search .................... 71/11, 12, 14, 71/23, 25, 27

[56] References Cited

U.S. PATENT DOCUMENTS 3,259,501  7/1966  Ulrey ............................................. 99/2

OTHER PUBLICATIONS

*Webster's II New Riverside University Dictionary*, p. 959 1984.

Primary Examiner—Deborah Jones
Assistant Examiner—Amy M. Harding
Attorney, Agent, or Firm—Daryl W. Schnurr

[57] ABSTRACT

A process for making organic slow release nitrogenous fertilizers from pyrolysis products obtained from the pyrolysis of biomass uses a chemical reaction to combine a nitrogen compound containing the —NH$_2$ group with the pyrolysis products to form a mixture. The mixture is heated to form organic nitrogen compounds. Various sources of biomass can be used. The mixture can be heated to remove water and to cause polymerization and solidification to occur. The mixture can also be combined with an absorbent. Previously, nitrogenous fertilizers had been produced using an ammoxidation process requiring long reaction times of up to several hours.

19 Claims, No Drawings

METHOD OF PRODUCING SLOW-RELEASE NITROGENOUS ORGANIC FERTILIZER FROM BIOMASS

BACKGROUND OF THE INVENTION

1. Field of the Invention

This invention relates to the production of organic slow-release nitrogenous fertilizers (O-SRNF) by reacting ammonia or related compounds like urea with liquids, vapours or solids obtained by pyrolysis of biomass substrates.

2. Description of the Prior Art

It has long been known that nitrogenous organic fertilizers can be produced by reaction between ammonia and humic acids naturally present in peat or lignite. In a process known as ammoxidation, coal or other carbonaceous material is subjected to a mild oxidation, usually with air, in order to increase its humic acid content and subsequently or simultaneously exposed to ammonia. The earliest patented process for production of nitrogenous organic fertilizers by the ammoxidation process was disclosed by N. Caro and A. R. Frank in British Patent Numbers 347641 (1929) and 349001 (1931). This pioneering work was soon followed by several related inventions, for instance Walton and Gardiner, U.S. Pat. No. 1,858,230 (1932). Applications to woody biomass [M. I. Chudakov, et al., USSR Patent Number 223,823 (1968); Y. K. Kim, et al., Ind. Eng. Chem. Prod. Res. Dev., 23 (1984) 620] and to technical lignin residues from pulping processes [W. J. Detroit, U.S. Pat. No. 4,846,871 (1989); D. Meier, et al., Proc. Second Brazilian Symposium on the Chemistry of Lignins and other Wood Components, (FAPESP) Sao Paulo, 1992, p. 178].

The principal feature of such fertilizers is that they combine the soil conditioning properties of organic manures and the nitrogen releasing properties of inorganic fertilizers. It would be desirable furthermore that the nitrogen be bound chemically in a form suitable for slow release by soil microorganisms since typically more than 50% of the input nitrogen in typical inorganic fertilizers based on ammonium, urea or nitrate is lost in run-off water. This not only represents a source of inefficiency but is also a major contributor to ground water pollution. The reactions between ammonia and humic acids appear to consist principally in the formation of ammonium phenolates and carboxylates, collectively designated as ammonium humates. On heating, these are converted first to the corresponding amides and subsequently to more stable amidine and iso-indole forms [K. Guruz, Fuel, 59 (1980) 772]. Unfortunately, while the nitrogen content of ammoxidated coals increases with temperature, so do the latter forms of nitrogen and these have been shown to be incapable of releasing the nitrogen into the soil [N. Berkowitz, et al., Soil Sci. 110 (1970) 211].

A further disadvantage of the ammoxidation process is the requirement for long reaction times, typically up to several hours, and substantial oxygen pressures, typically up to 4 MPa. It is known that some of the chemical problems can be solved by first oxidizing the carbonaceous substrate with nitric acid and then reacting it subsequently with ammonia [J. Coca, et al., Ind. Eng. Chem. Prod. Res. Dev., 23 (1984) 620]. In this case, much more nitrogen becomes available but the processing costs are higher.

At present, most slow-release fertilizers are in the form of urea formaldehyde products (R. M. Schmidlkofer, Chemtech, May 1994, p. 54). Sulfur coated urea and condensation products of urea and aldehydes have made more limited progress due to high costs. Nevertheless, these formulations establish that the products of the rections between carbonyl compounds, aldehydes in particular and ammonia or urea contain nitrogen in suitable form for slow release of nitrogen to soil. Presumably, the nitrogen is substantially present in the form of imines and higher molecular weight products derived from them.

SUMMARY OF THE INVENTION

An object of this invention is to provide a method for converting biomass to nitrogenous organic fertilizers (O-SRNF) without oxidation.

Another object of this invention is to provide a method for the conversion of biomass to nitrogenous organic fertilizers by pyrolysis of the biomass and by combining the liquid and/or solid products of pyrolysis with a suitable nitrogen containing compound.

Still another object of this invention is to provide a method for stabilizing these fertilizers by combination with a suitable absorbent.

Further, nitrogen may be added to the biomass to convert it to nitrogenous organic fertilizer by adding ammonia during pyrolysis, or adding other compounds, which release ammonia on thermal decomposition.

A further object of this invention is to enhance the economic viability of fast pyrolysis processes, especially as an integral part of a "bio-refinery", by providing a method for utilization of part or all of the liquid and solid products of such processes for the production of high value organic slow release nitrogen fertilizers and further to eliminate or reduce waste streams.

A still further object of this invention is to provide a method whereby biomass can be recycled in an efficient manner by converting wastes to organic fertilizers which can be returned to the soil.

A process for making organic nitrogenous fertilizers from at least one of ligno-cellulosic materials and starchy materials, said process comprising:
(a) subjecting at least one of said materials to pyrolysis to produce pyrolysis products and chemically combining a suitable nitrogen compound containing the —$NH_2$ group with said products to form organic nitrogen compounds and recovering the organic nitrogen compounds so formed.

An organic nitrogen compound suitable for use as a fertilizer comprising a chemical combination of pyrolysis products and a suitable nitrogen compound containing the -$NH_2$ group to form an organic nitrogen compound.

DESCRIPTION OF A PREFERRED EMBODIMENT

Ligno-cellulosic biomass already contains about: 35 to 44 wt % of oxygen. It is desirable for the production of an organic slow-release nitrogen fertilizer (O-SRNF) to maintain the oxygen content at these levels but converted into functional groups, aldehydes in particular, suitable for reaction with appropriate nitrogenous compounds. This goal can be achieved by pyrolysis of biomass.

Fast or flash pyrolysis involves the rapid heating of a substrate in a non-oxidizing atmosphere. When biomass is pyrolyzed at heating rates of the order of 1000° C. per second or greater to final temperatures in excess of 350° C. and vapour residence times are kept short (i.e. less than three seconds), high yields of liquids can be obtained by condensation of the pyrolysis vapours. The other products of pyrolysis consist of a solid char and permanent gases like carbon monoxide, carbon dioxide and methane.

The liquid product is referred to variously as the pyrolysate, pyrolytic tar or pyrolytic oil. It is possible to attain the desired heating rates in a variety of apparatae. These include fluidized beds, entrained beds, vortex reactors, pyrolytic mills, ablative pyrolysis reactors and "rapid thermal processing" reactors, circulating fluid beds, among other embodiments. Lower heating rates can be tolerated if vapour residence times are kept sufficiently small as obtained in vacuum pyrolysis processes. These various biomass pyrolysis technologies have been reviewed by A. V. Bridgwater and S. A. Bridge in "Biomass Pyrolysis Liquids Upgrading and Utilisation", A. V. Bridgwater and G. Grassi (eds.), Elsevier, London, 1991.

While the data provided in the subsequent description were obtained by flash pyrolysis in a fluidized bed, similar liquid and char pyrolysates can be obtained from all reactor systems which are characterized by high temperature and/or short residence times as pointed out by G. Underwood and R. G. Graham in U.S. Pat. No. 4,994,297 (1991). For example, Table 5 of this reference shows that the results obtained by fluidized bed pyrolysis and reported earlier by D. S. Scott, [D. S. Scott and J. Piskorz in Bioenergy 84, Vol. III, H. Egneus and A. Ellegard (eds.), Elsevier, London, 1985] are comparable to those from the rapid thermal processing process.

Some typical yields obtained by fast pyrolysis of various biomass in a fluidized bed are shown in Table 1 below:

good sources of humic material and hence to have useful soil conditioning properties.

The pyrolysis products are preferably chemically combined with a suitable nitrogen compound containing the $-NH_2$ group by forming a mixture between said products and said suitable nitrogen compound. The mixture is then mixed and heated to form organic nitrogen compounds. Preferably, the mixing and heating is carried out in a temperature range of approximately 150° C. to approximately 180° C.

Several pyrolysis liquids obtained by fluidized bed flash pyrolysis of different feedstocks at different temperatures were analysed for functional group content: with the results shown in the following Table 2:

| Feedstock | Pyrolysis Temperature (°C.) | Moles Functional Groups/kg Organic Liquid | | | | |
|---|---|---|---|---|---|---|
| | | Carboxyl | Carbonyl | Hydroxyl | Phenolic | Methoxyl |
| Maple | 480 | 2.1 | 5.7 | 0.92 | 2.8 | 2.1 |
| Wheat Straw | 500 | 1.4 | 5.3 | 1.40 | 3.0 | 1.1 |
| Poplar-Aspen | 450 | 2.1 | 6.2 | 0.77 | 2.8 | 1.6 |
| " | 500 | 1.6 | 6.9 | 0.87 | 2.8 | 1.5 |
| " | 550 | 1.7 | 6.6 | 0.77 | 2.8 | 1.2 |
| Peat Moss | 520 | 1.2 | 3.0 | 1.30 | 1.8 | 0.7 |

These results show that, depending on the feedstock, a total of between 6 and 11 moles of carboxyl, carbonyl and phenolic groups are available. If indeed these are the groups responsible for reaction with ammonia, urea or amino compounds in general, then complete reaction would therefore result in the incorporation of between 10 and 17 wt % of nitrogen/kg of organic liquid product.

These expectations are reasonable because it is the teaching of organic chemistry (e.g. see J. March, "Advanced Organic Chemistry", 3rd ed., Wiley, N.Y., 1985, Chapter 6) that aldehydes and ketones react with primary amino compounds to give imines which may subsequently polymerize. Furthermore, in the presence of an acid or base catalyst, Mannich type reactions may occur in which ammonia or one of its salts undergoes condensation with an aldehyde and a

| | Yields, Wt % of mf Feed | | | | | | |
|---|---|---|---|---|---|---|---|
| Feedstock | Poplar-Aspen Wood | Wheat Chaff | Hog Fuel | Sulfite Pulp Mill waste | Bleached Cardboard | Sorghum Bagasse | Peat Moss |
| Gas | 10.8 | 15.9 | 13.1 | 9.3 | 20.5 | 11.7 | 16.2 |
| Char | 7.7 | 17.6 | 31.9 | 19.5 | 3.8 | 13.4 | 26.3 |
| Water | 12.2 | 15.7 | 12.1 | 20.3 | 16.4 | 10.6 | 8.2 |
| Organic Liquid | 65.8 | 51.0 | 46.6 | 46.8 | 53.3 | 58.8 | 49.1 |

This invention is based on the discovery that the liquids produced by flash or fast pyrolysis of biomass react readily with ammonia, urea and related compounds to form organic nitrogen compounds and that furthermore, these compounds polymerize and solidify on heating to give stable products which give demonstrable release of nitrogen in greenhouse tests. These products therefore function as organic slow-release nitrogen fertilizers. Chemical analysis shows that the pyrolysis liquids contain high concentrations of carbonyl, carboxyl and phenolic functional groups and it is likely that these groups are largely responsible for the reactions with ammonia. The pyrolysates also contain a substantial amount of lignin degradation products and are therefore likely to be compound containing an active hydrogen to give Mannich bases. The latter may subsequently condense with additional aldehydes or active compound. Such reactions would be desirable for the purposes of this invention as they would be expected to promote cross-linking and therefore stabilization of the product. A further type of reaction which may occur is that between carboxylic acids and ammonia or amines to give salts, which may subsequently decompose thermally to amides.

It was determined that in many instances, a large fraction of the carbonyl groups consist of only a few simple aldehydes, namely hydroxyacetaldehyde, glyoxal, methyl glyoxal, formaldehyde and acetaldehyde. This is significant since aldehydes are more reactive towards ammonia than ketones. Similarly, only a few simple carboxylic acids, especially formic and acetic acids, appear to be the principal contributors to the carboxyl group content. Some typical concentrations of some of these compounds in biomass pyrolysates obtained by pyrolysis at around 500° C. of a range of biomass feedstocks including wood, agricultural wastes, forest residues and industrial biomass wastes are shown in Table 3 below:

| Feedstock | Wt % of Organic Liquid Product | | | | | | |
|---|---|---|---|---|---|---|---|
| | Poplar-Aspen Wood | Wheat Chaff | Hog Fuel | Bleached Cardboard | Sorghum Bagasse | Sulfite Pulp Mill waste | Peat Moss |
| Hydroxyacetaldehyde | 15.2 | 12.8 | 8.0 | 19.3 | 12.2 | 17.0 | 1.4 |
| Glyoxal | 3.3 | 1.4 | 1.1 | 2.6 | 0.6 | 1.4 | n.d. |
| Formaldehyde | 1.8 | 2.6 | 1.8 | 6.6 | 6.1 | n.d. | n.d. |
| Formic Acid | 4.7 | n.d. | 2.3 | n.d. | n.d. | 3.6 | 15.5 |
| Acetic Acid | 8.3 | 12.0 | 5.6 | n.d. | 4.3 | n.d. | 4.5 |
| "Pyrolytic Lignin" | 24.6 | 29.6 | 59.4 | 4.0 | 30.6 | 6.4 | 49.2 |

It is apparent that in the case of poplar wood, for instance, the simple aldehydes listed can contribute in excess of 50% of the carbonyl groups present while formic and acetic acids can constitute nearly all the carboxyl groups. Nevertheless, the identities of many of the carbonyl compounds remain unknown in most cases.

It has also been determined that the pyrolysis liquids from ligno-cellulosic biomass typically contain between 20 and 50 wt % of largely lignin-derived material which may be readily precipitated by adding water. This material, which has been referred to as "pyrolytic lignin", has been shown by NMR analysis to be chemically very similar to "virgin lignin", [D. Radlein, et al., J. Anal. Appl. Pyrol., 12 (1987) 51]. Most of the phenolic groups in the pyrolysis liquids are believed to be associated primarily with this fraction. Besides its nitrogen capacity, this fraction is also beneficial in that lignin plays an important role in the formation of organic matter in soil where it is slowly biodegraded to give humic matter. The pyrolytic lignin fraction is shown in the preceding Table 3 for various feedstocks.

The following examples are intended to illustrate the various aspects of the present invention without limiting the invention in any way.

EXAMPLE 1

A sample of pyrolysis tar obtained by the flash pyrolysis of eucalyptus wood was used to prepare a nitrogen enriched fertilizer. The sample contained 17.2% water. The analysis of this tar for some of the aldehydic and carboxylic acid components was as follows:

| | Wt % of Organic Fraction of Eucalyptus Tar |
|---|---|
| Hydroxyacetaldehyde | 7.1 |
| Glyoxal | 1.4 |
| Formaldehyde/Formic Acid | 3.1 |
| Acetic Acid | 3.8 |
| "Pyrolytic Lignin" | 36.4 |

This tar therefore contains only about 50% as much of these key components as does a poplar-aspen tar and the nitrogen uptake may be expected to be correspondingly low.

Fifty grams of the tar were mixed with 12 g of urea and the mixture heated with stirring at 150° C. The viscosity gradually increased and the urea was completely dissolved. After thirty minutes, the mixture had become a solid mass with a liquid crystalline appearance. On cooling, it became hard and brittle and was ground to give a dark brown hygroscopic powder. The weight loss of the mixture was 27 wt % which exceeds that expected on the basis of the water content of the tar. It is likely that, at the reaction temperature, some dehydration reactions took place and some volatiles were lost from the tar.

The amount of urea added was equivalent to 8 moles of functional groups/kg of pyrolysis tar. This result is near the expected lower limit of the reactive functional group content of the tar, including carbonyl, carboxyl and phenolic groups. Urea is well known to react readily with aldehydes to form resins (Merck Index, 1983). On account of its difunctional nature, it is an excellent cross-linker.

EXAMPLE 2

A sample of fertilizer, designated PNU1 was prepared according to the method of Example 1. Sixteen pots each of maize and beans were germinated on a nutrient free artificial soil, Turfase. After germination, the plants were thinned to four per pot. Four groups of four pots each were treated as follows:

| Group A | No fertilizer. |
|---|---|
| Group B | 0.25 g of PNU1 initially and again after four weeks. |
| Group C | Two treatments per week of 250 ml. of a solution containing 100 ppm of a standard 20-20-20 fertilizer. |
| Group D | Combination of treatments of Groups B and C. |

The plants were watered daily and grown for eight weeks in a greenhouse. At the end of this time, the whole plants, including roots, were harvested and dried at 120° C.

The average weight of the plants in each group were found to be as follows:

| Beans A | 0.47 g |
|---|---|
| Beans B | 0.67 g |
| Beans C | 1.24 g |
| Beans D | 1.50 g |
| Maize A | 1.08 g |
| Maize B | 1.74 g |
| Maize C | 5.91 g |
| Maize D | 5.95 g. |

Therefore, the beans and maize treated with PNU1 alone gained 42.5% and 61.1% more weight respectively than the unfertilized plants. The beans and maize that received both the standard fertilizer and PNU1 gained 21.0% and. 0.7% more weight respectively than those that received only the standard fertilizer.

It is concluded that the organic fertilizer described herein is capable of releasing available nitrogen to the soil and is non-toxic to plants.

EXAMPLE 3

2.67 g of a pyrolysis tar were combined with 2.00 g of ground sphagnum high moor peat (which had a moisture content of 33.5 wt %) and 3.0 g of a 29 wt % aqueous ammonia solution. The mixture was heated at 60° C. for thirty minutes and then at 105° C. for one hour in an open vessel. The resulting solid, which had the appearance of the original peat, was dry and non-hygroscopic with a final weight of 3.41 g. This sample was designated PTN1. The expected final mass, assuming ony loss of physically bound water, was 3.54 g. It should be noted that reaction of ammonia with a carbonyl compound to give an imine takes place with negligible change in mass:

R—CO—R'+NH$_3$→R—C=NH—R'+H$_2$O.

Therefore, there was some weight loss of volatile components from the tar.

It is noted that, since imines are readily rehydrolysed to the parent carbonyl compound, it is important to carry out the amination reaction under conditions under which water can be removed. This will prevent reversal of the reaction as well as promote subsequent polymerization.

A portion of sample PTN1 was thoroughly extracted with water and then dried at 105° C. This was designated as sample PTN2. Elemental analyses were carried out on the various samples with the following results:

| Sample | Wt %, moisture free | | | |
|---|---|---|---|---|
| | C | H | N | O (by difference) |
| Typical Hardwoood Pyrolysis Oil | 51–59 | 5–7 | 0.05–0.5 | |
| Premier Peat | 51.55 | 5.49 | 1.11 | 41.8 |
| PTN1 | 54.82 | 5.80 | 5.06 | 34.3 |
| PTN2 | 56.52 | 5.76 | 4.31 | 33.4 |

These results show that the total nitrogen content was 8.1 wt % on the basis of moisture-free pyrolysate incorporated into the formulation, while the insoluble nitrogen content was 6.9 wt % on the same basis. Furthermore, the results demonstrate that the pyrolysis tar can be combined with a suitable absorbent (peat in this example), to give a friable non-hygroscopic product.

EXAMPLE 4

Experiments were conducted to determine whether absorbents other than peat could be used for stabilization of the fertilizer and to reduce hygroscopicity. The pyrolytic char, which is a by-product of the pyrolysis process, has a high content of oxygenated functional groups and in fact represents a partially activated carbon. It may therefore serve not only as an absorbent, but may also bind nitrogen directly by reaction with —NH$_2$ groups. Accordingly, the capacity of pyrolytic char for stabilization of the fertilizer product was investigated.

Fertilizers were prepared by combining varying amounts of pyrolysis tar with 1.0 g of pyrolytic char in the same manner as that described for peat in Example 3. The ratios of tar to char varied from 0.5:1 through to 2.42:1. In all cases, the weight loss after drying at 105° C. was about 30%. In all cases, the product was a friable non-hygroscopic solid.

It is concluded that activated carbons, including pyrolytic chars, are suitable absorbents for stabilization of the nitrogenous fertilizers described herein.

EXAMPLE 5

Sawdust from Alberta Poplar wood was impregnated with an aqueous solution of urea and then dried to a moisture content of 2%. The urea content of the impregnated sawdust was 16.4 wt % on the basis of the moisture-free wood. The impregnated wood was pyrolyzed in a fluidized bed at 500° C. at a vapour residence time of 0.36 seconds (Run #302). The condensed pyrolysate had an organic content of 76.5 wt % on the basis of the urea and moisture-free wood. The yield of carbon dioxide was 10.0 wt % on the same basis. This is much higher than the expected yield of 5 to 6 wt % from untreated wood under the same pyrolysis conditions and indicates that the urea had been hydrolyzed to liberate ammonia according to the reaction:

NH$_2$CONH$_2$+H$_2$O→CO$_2$+2 NH$_3$

The overall mass balance was 114,5% on the basis of urea-free wood, which indicated that there was substantial nitrogen uptake. The liquid pyrolysis product contained no urea or ammonia. Elemental analysis of this product gave the following results in wt %:

| Carbon | Hydrogen | Nitrogen |
|---|---|---|
| 48.54 | 6.95 | 10.30 |

If all of the nitrogen contained in the urea had been incorporated into the liquid pyrolysate, its nitrogen content would be expected to be 10.0%. Therefore, it may be concluded that essentially all the nitrogen added as urea was incorporated into the liquid product.

Furthermore, the result implies that free ammonia or any compound which will liberate ammonia under the pyrolysis conditions can equally well be reacted directly with the hot vapours in the pyrolysis reactor. Such compounds include ammonium salts since these are known to react directly with aldehydes and which may also decompose or be hydrolysed to liberate ammonia at pyrolysis temperatures.

What we claim as out invention is:

1. A process for making organic nitrogen compounds suitable for use as a fertilizer, said process comprising:
    (a) subjecting at least one material selected from the group consisting of ligno-cellulosic materials and starchy materials to pyrolysis to produce solid, liquid, and vapor products;
    (b) chemically combining a nitrogen compound containing an —NH$_2$ group with said liquid products to form organic nitrogen compounds; and
    (c) and recovering the organic nitrogen compounds.

2. A process as claimed in claim 1 wherein step (b) comprises combining said nitrogen compound containing the —NH$_2$ group with said liquid products to form a mixture and mixing and heating said mixture to form organic nitrogen compounds.

3. A process as claimed in claim 2 wherein the ligno-cellulosic materials and starchy materials are biomass selected from the group consisting of agricultural waste, forestry waste, municipal solid waste, wood, grasses, algae, peat, lignite, food processing waste and beverage processing waste.

4. A process as claimed in claim 3 wherein the nitrogen compound is added during the pyrolysis process.

5. A process as claimed in claim 3 wherein the nitrogen compound is added prior to pyrolysis.

6. A process as claimed in claim 3 wherein the nitrogen compound is added to the liquid products.

7. A process as claimed in any one of claims 1, 2 or 6 wherein the nitrogen compound is added after producing the liquid products.

8. A process as claimed in claim 3 wherein the nitrogen compound is selected from the group consisting of urea, an aqueous solution of urea, an aqueous ammonia solution, ammonia, an amine, an amino-acid, a protein and an ammonium salt.

9. A process as claimed in claim 8 wherein the organic nitrogen compound is added with an absorbent selected from the group consisting of peat, moss, pyrolyric char, charcoal, lignin, manure and finely divided ligno-cellulosic biomass.

10. A process as claimed in claim 9 wherein the organic nitrogen compounds are heated following their formation to remove water.

11. A process as claimed in claim 10 wherein the organic nitrogen compounds are heated to a sufficient temperature to cause polymerization.

12. A process as claimed in claim 11 wherein the organic nitrogen compounds are heated to a sufficient temperature to cause solidification.

13. A process as claimed in any one of claims 1, 2 or 3 wherein the pyrolysis process is carried out at a vapour residence time of less than three seconds.

14. A process as claimed in any one of claims 1, 2 or 3 wherein the pyrolysis process is carried out at a heating rate of at least 1000° C. per second to a temperature of at least 350° C.

15. A process as claimed in any one of claims 2, 3 or 4 wherein the mixing and heating take place within a temperature range of approximately 150° C. to approximately 180° C.

16. An organic nitrogen compound suitable for use as a fertilizer comprising a chemical mixture of pyrolysis liquid products and a suitable nitrogen compound containing an $-NH_2$ group.

17. An organic nitrogen compound as claimed in claim 16 wherein the pyrolysis liquid products are formed from biomass selected from the group consisting of agricultural waste, forestry waste, municipal solid waste, wood, grasses, algae, peat, lignite, food processing waste and beverage processing waste.

18. An organic nitrogen compound as claimed in any one of claims 16 or 17 wherein the organic nitrogen compound is a solid.

19. An organic nitrogen compound as claimed in any one of claims 16 or 17 wherein the mixture is combined with an absorbent selected from the group consisting of peat, moss, pyrolyric char, charcoal, lignin, manure and finely divided ligno-cellulosic biomass.

* * * * *